United States Patent [19]

Ammon

[11] Patent Number: 5,723,768
[45] Date of Patent: Mar. 3, 1998

[54] PROCESS FOR THE EARLY RECOGNITION OF HYDROPLANING OF A VEHICLE TIRE ON A WET ROAD

[75] Inventor: Dieter Ammon, Remseck - Neckargröninge, Germany

[73] Assignee: Daimler-Benz AG, Germany

[21] Appl. No.: 755,365

[22] Filed: Nov. 25, 1996

[30] Foreign Application Priority Data

Nov. 24, 1995 [DE] Germany .................. 195 43 928.7

[51] Int. Cl.⁶ ........................................... B60Q 1/00
[52] U.S. Cl. .................. 73/8; 73/9; 73/146; 180/271; 280/757; 340/438; 340/441
[58] Field of Search .................. 152/208; 73/8, 73/9, 146, 496; 180/197, 271, 345; 280/757; 301/41.1; 324/178; 340/438, 441, 444, 459

[56] References Cited

U.S. PATENT DOCUMENTS

| | | | |
|---|---|---|---|
| 5,032,821 | 7/1991 | Domanico et al. | 180/197 |
| 5,273,315 | 12/1993 | Debus | 280/762 |
| 5,350,035 | 9/1994 | Bodier et al. | |
| 5,424,714 | 6/1995 | Kin et al. | 340/438 |
| 5,481,455 | 1/1996 | Iwata et al. | 180/197 |
| 5,502,433 | 3/1996 | Breuer et al. | 180/197 |
| 5,532,678 | 7/1996 | Kin et al. | 340/444 |

FOREIGN PATENT DOCUMENTS

| | | |
|---|---|---|
| 4115367C2 | 11/1992 | Germany. |
| 4329745C1 | 7/1994 | Germany. |
| 4317030A1 | 11/1994 | Germany. |
| 5-319040 | 12/1993 | Japan. |
| WO 93/1043A1 | 5/1993 | WIPO. |

*Primary Examiner*—Richard Chilcot
*Assistant Examiner*—Eric S. McCall
*Attorney, Agent, or Firm*—Evenson, McKeown, Edwards & Lenahan, P.L.L.C.

[57] ABSTRACT

The invention provides a process for the advance recognition of the hydroplaning of a vehicle tire on a wet road, in which the rotational speed of the wheel carrying the tire is sensed by a rotational speed sensor and the frequency spectrum of the rotational wheel speed is evaluated. According to the invention, in the frequency range above 20 Hz, the natural resonance behavior of the rotational tire vibrations is evaluated continuously, and a conclusion on hydroplaning of the tire is drawn from detuning of the rotatory natural frequencies.

10 Claims, 2 Drawing Sheets

5,723,768

PROCESS FOR THE EARLY RECOGNITION OF HYDROPLANING OF A VEHICLE TIRE ON A WET ROAD

BACKGROUND AND SUMMARY OF THE INVENTION

This invention relates to a process for the early recognition of hydroplaning of a vehicle tire on a wet road. The process can be used particularly as an early warning system against hydroplaning.

When a vehicle travels on a road having a film of water, friction sufficient to facilitate the transmission of braking, acceleration and cornering forces between the vehicle tires and the road will exist only if the vehicle tires displace the film of water in at least a significant portion of the flattened area of the tire, so that a direct contact between the vehicle tire and the road is ensured. Since the amount of water which can be displaced from the tire contact area per unit time is limited, a water wedge which slides under the tire contact area will form at increasing driving speeds, as a function of the water level at the inlet area of the tire contact area. In this case, the horizontal forces required for safe driving can still be transmitted in the rearward area of the tire contact area which has not yet been affected by the water wedge.

The farther the water wedge advances, the smaller the contact surface between the vehicle tire and the road. Finally, the vehicle tire will float completely on a hydrodynamic film of water. In this condition, which is called "hydroplaning", horizontal forces can no longer be transmitted. As a result of the elimination of cornering forces and of possible braking forces, the vehicle can no longer be controlled in this condition. The driver will become aware of the occurrence of hydroplaning only by the absence of the cornering forces in the steering behavior, which occurs without warning.

The generally known antilocking systems (ABS) and wheel slip control systems (ASR) analyze rotational wheel speeds between powered and nonpowered wheels in order to detect wheel slip (in the case of a wet road). Hydroplaning can therefore be recognized fast and reliably by the occurrence of high rotational speed differences. An electronic system aimed at the analysis of these high rotational wheel speed differences therefore responds, at the earliest, after the occurrence of the hydroplaning condition. An early warning or a determination of the degree of danger when the road is wet, is therefore not possible.

Known processes for early warning of imminent hydroplaning also analyze rotational wheel speed signals in order to continuously monitor the frictional connection between the road and the tire on the basis of slip calculations. By means of a driving condition analysis, critical deterioration of the frictional connection is to be detected early and a warning with respect to an hydroplaning is to take place in time.

One such process is disclosed in German patent document DE 43 29 745 C1, in which the wheel slip and simultaneously acting wheel rotation forces are determined continuously. A continuously updated straight regression line is formed by the determined pairs of values, the slope of the straight regression line being a measurement of the quality of the frictional connection between the road and the tire. When the slope of the straight regression line falls below the slope of a stored straight limit line, a warning signal is emitted. The slope of the straight limit line is automatically adapted to the current road conditions (even, uneven) which are roughly determined from the unprocessed signals of the rotational wheel speed sensors, by means of a frequency analysis. A disadvantage of this process is that, even with the high expenditures for the signal processing, it is at least still questionable whether the model on which the process is based adequately describes the transition into the hydroplaning condition.

In another process, disclosed in German patent document DE 43 17 030 A1, a vehicle condition evaluation is determined by means of a characteristic-diagram computer, based on the values of the slip calculation, the driving speed and the processed signal of a wetness sensor. The determined driving condition evaluation is indicated to the vehicle steerer.

In another process, disclosed in German patent document DE 41 15 367 C2, the values of the slip calculation are linked with the values of acoustic sensors which sense the vibration behavior of the chassis or of the vehicle body. Because of different vibration behavior on a dry road and on a wet road, a rough evaluation can be made of the road condition can take place, for example, by means of a frequency analyzer and a comparison with stored patterns.

Processes based on a slip calculation have the basic disadvantage that, for a reliable early recognition, even very small slip changes must be evaluated because large slip changes already characterize the transition into the hydroplaning condition for which a warning is to be expressed. The evaluation of the correspondingly low rotational speed differences therefore requires considerable expenditures, one of which is the elimination of the noise generated by the unevenness of the road.

It is an object of the present invention to provide a process for early recognition of hydroplaning of a vehicle tire which allows a reliable estimate of vehicle instability due to hydroplaning of the vehicle tire, with as little expenditure as possible.

This object is achieved by the process according to the invention, in which the connection of the tire to the road is detected by detecting a detuning the natural rotational vibrations of the tire influenced thereby. That is, such detuning is directly related to the size of the contact zone, which constantly decreases as the hydroplaning condition is approached. Imminent hydroplaning can therefore be detected with sufficient clarity from the detuning of the natural resonances, so that a reliable early warning is possible.

Other objects, advantages and novel features of the present invention will become apparent from the following detailed description of the invention when considered in conjunction with the accompanying drawings.

DETAILED DESCRIPTION OF THE DRAWINGS

Figure 1:
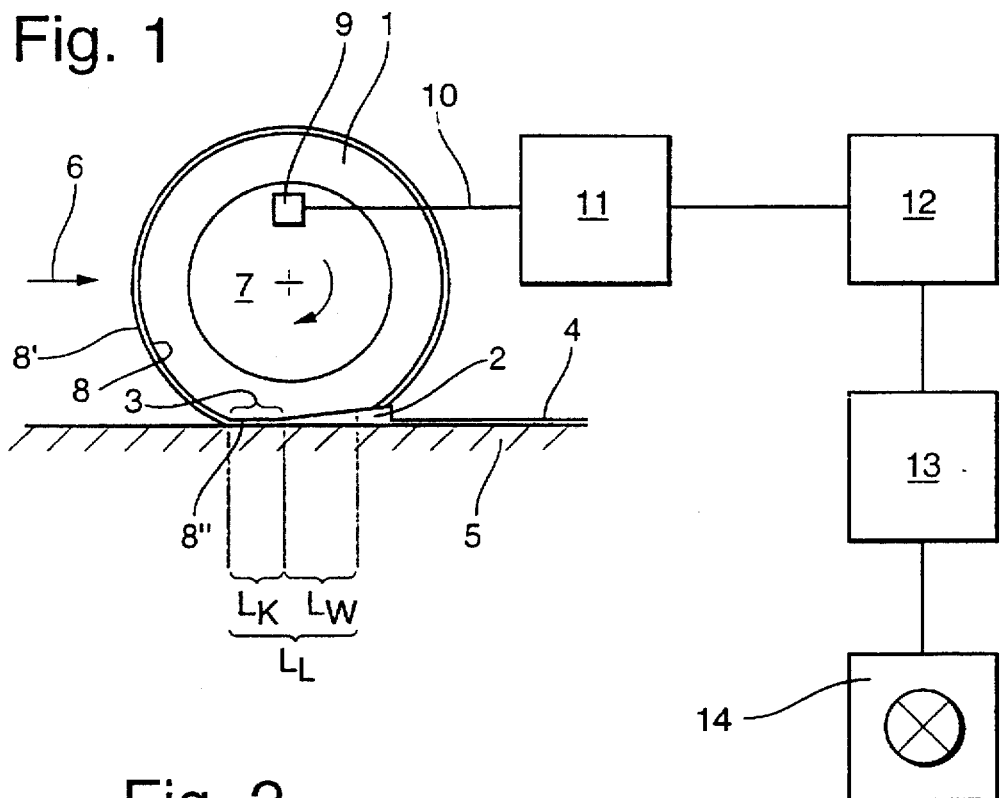
FIG. 1 is a schematic depiction of a vehicle tire on a rain-wet road together with a diagram of the process according to the invention.

As illustrated in FIG. 1, due to the equilibrium of currents and forces, a water wedge 2 is formed under and (viewed in the driving direction 6) in front of the tire 1. This water wedge 2 considerably reduces the contact zone 3 between the tire and the road 5 covered by a film 4 of water. A suitable measure for the degree of hydroplaning, hereinafter called the hydroplaning factor a, is formed by the ratio of the length $L_W$ of the water wedge 2 and of the original length of the tire contact area $L_L$. The length $L_W$ of the water wedge 2 is equal to the difference between the tire contact area length $L_L$ and the contact zone length $L_K$. The measure thus defined $$a=(L_L-L_K)/L_L$$

varies within an interval from 0 to 1, with a=0 indicating a condition without any hydroplaning, and a=1 indicating a condition with complete hydroplaning. By means of the hydroplaning factor, the approach of a hydroplaning condition is imaged on a continuous approach of the value a=1. By observing the hydroplaning factor, timely intervention is possible, before the tires lose their guiding capacity completely.

Hereinafter, the process according to the invention will be illustrated, by means of which the hydroplaning factor a or the length of the contact zone 3 can be detected basically by means of measuring techniques.

The formation of a water wedge 2 between the tire 1 and the road 5 results in a corresponding shortening of the force-transmitting contact zone 3 (FIG. 1). In addition to changed application points of lateral and longitudinal forces of the tire, this phenomenon is accompanied by a change of the longitudinal stiffness of the tire, because the surface part of the profile portion 8" of the tire which engages with the road and establishes a static friction connection is reduced relative to the length $L_W$ of the water wedge 2.

The longitudinal stiffness $K_1$ of the tire is defined as the force required for a defined translational longitudinal displacement of the contact zone 3 relative to the rim 7. It is the result of a series connection of the torsional stiffness $K_d$ between the tire belt 8 and the rim 7 as well as of the shearing stiffness $K_s$ of the engaging profile portion 8" of the tire profile 8', the latter having a large part in the overall stiffness $K_1$. Therefore, a shortening of the contact zone 3 due to hydroplaning causes a clear reduction of the shearing stiffness $K_s$ and therefore also of the whole longitudinal stiff $K_1$ of the concerned tire. This can, in turn, be detected, for example, from a detuning of the natural frequency of a rotational basic natural waveform of the tire at which the tire belt, viewed in a system of coordinates which is fixed relative to the rim, carries out a rotational vibration about the rim center. Specifically, this means that the natural frequencies of the tire change during the hydroplaning. In this case, the lower inphase natural vibration is generally of a higher frequency whereas the opposite-phase resonance shifts toward lower frequencies. Such detuning is determined from changes of associated damping (which, however, is also influenced by the driving speed—because of the complex kinematics of the tire-road contact).

A natural vibration analysis of the wheel rotation should therefore permit sufficient conclusions on the size of the contact zone 3, and therefore on the hydroplaning factor a or generally on the hydroplaning condition.

As a result of unevenness of the road and other interferences, permanent variations of the extent to which the tire can respond to torsional vibrations are caused which are superimposed on the wheel rotation. Early recognition of hydroplaning of the tire is therefore the result of a precise determination and natural-vibration analysis of the rotational wheel speeds. Because of the slight damping, the resonance ratios, and thus the resonance frequencies, particularly those of the basic vibration, are clearly pronounced and easily measurable.

Generally, the sensed frequency spectrum of the rotational wheel speeds has several different ratios (resonances) which are each characteristic of specific types of vibration of the vehicle and of the wheels. Vertical vibration of the vehicle body has the lowest natural frequency (a frequency range of 1–2 Hz), followed by the natural resonance caused by the wheel suspension (which is in the range of from 12 to 18 Hz). Natural frequencies which are the result of a tire vibration are exhibited only above approximately 20 Hz: A first natural frequency of the tire in the range of from 30 to 80 Hz and a second natural frequency of the tire in the range of from 100 to 350 Hz. The two natural frequencies correspond to an inphase or opposite-phase combination vibration of the already mentioned torsional and shearing vibrations, which are characterized by the torsional stiffness $K_d$ and by the shearing stiffness $K_s$.

In FIG. 1, the rotational wheel speeds are detected in a known manner, by means of a rotational wheel speed sensor 9 which has sufficiently precise angular resolution for sensing the tire vibrations. Optionally a band pass filter 11 with cut-off frequencies f1=30 Hz and f5=350 Hz, may be used to isolate the frequency range which is of interest for the evaluation of the rotational natural frequency spectrum of the tire. The rotational wheel speed signal 10 thus determined is then subjected to spectral analysis 12.

In the simplest case, the spectral analysis 12 is performed by three frequency-selective band pass filters which are tuned to the resonance frequencies f2=40 Hz, f3=80 Hz and f4=160 Hz. These frequencies f1–f5 are of course numerical examples which, although they are realistic values, cannot be generally valid because they depend on many factors, such as the tire type and the tire pressure. In an evaluation step 13, the signal intensities are compared in the different sections of the frequency range. Therefore, by means of the cross-comparison of the intensity values, the frequency value and band width of the basic resonance can be determined, and thus also sudden or slow changes because of the start of hydroplaning.

In particular, a value for the above-defined hydroplaning factor a can be determined from the shift of the basic resonance. This value can be used to control a regulating intervention, for example, a power regulating, a power limiting or a regulating of the vehicle handling. It can also be reported to the driver by means of an indication 14, either by direct indication of the value of a or as an evaluated signal in the sense of a warning indication which responds when the hydroplaning factor a exceeds a limit value a*, for example a*=0.8.

The hydroplaning factor a can be derived from the shifting of the basic resonance pattern by comparison with stored patterns or by means of a model-based analysis.

Alternatively, the spectral analysis 12 can also be performed by means of a Fast Fourier Transformation which continuously calculates the frequency spectrum that is of interest from the rotational wheel speed signal 10. In the evaluation step 13, the frequency spectrum must then be evaluated by means of known processes based on stored spectrums and characteristic curves or by means of a mathematical tire model.

Figure 2:
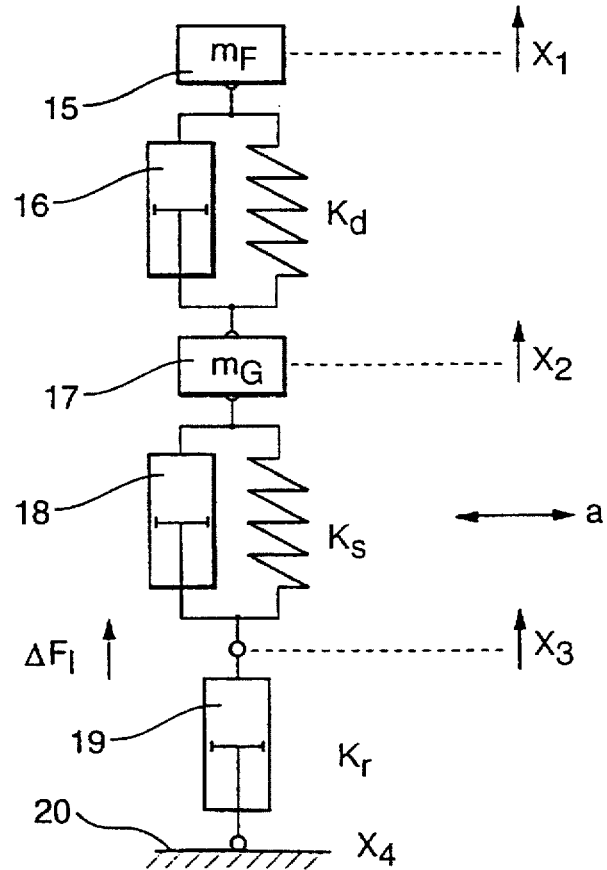
FIG. 2 is a diagram of a tire model for the simulation of the tire and its connection to the road.

FIG. 2 illustrates a mechanical replacement model for simulating tire behavior. It includes a rigid body model of a tire belt and a rim and is suitable for a model-based analysis and identification of tire resonances. Apart from deformations in the proximity of the contact zone, the tire belt 17 (which as a rule is a steel belt) is understood to be a rigid, rotationally symmetrical ring shell with a mass $m_G$. On the one hand, this ring shell is coupled to the rim 15 (with elastic and viscous damping), by way of massless spring-damper elements 16. (The mass of the lateral walls is included in the mass of the rim $m_{F}$.) The previously discussed torsional stiffness $K_{d}$ is the parameter which is characteristic of elastic torsional vibrational deflections of the belt with respect to the rim. On the other hand, the belt 17 is connected to the force-transmitting profile portion of the tire by means of second spring-damper elements 18 whose characterizing elastic parameter is the shearing stiffness $k_{s}$. The actual stationary longitudinal transmission between the tire and the road is simulated by a generalized damping element 19 with a characteristic damping value $K_{r}$. Unevenness of the road 20 causes the fluctuation $\Delta F_{1}$ of the horizontal frictional forces which, during the rolling of the tire, must be generated by the contacting profile portion. The horizontal fluctuations $\Delta F_{1}$ result from the projection of the vertical-force or wheel load fluctuations $\Delta F_{z}$ of the wheel in the longitudinal direction, which fluctuates always occur during driving on real roads, due to unevenness of the road, and can be derived from a suitable vertical-dynamics model.

The generalized coordinates $x_{1}$ to $x_{4}$, within the scope of this model, describe a force transmission from the connection to the road $x_{4}$ to angular changes of the rotating angle $x_{1}$ of the rim. Because of the connection $x_{4}$ of the tire to the road, the road unevenness, as determined by a suitable vertical-dynamics model, causes an additional horizontal deflection $x_{3}$ of the profile portion of the contact zone, and finally a rotating-angle deflection of the belt 17 with respect to the rim 15, which is described by the rotating angle $x_{2}$ of the belt in a rim-fixed system of coordinates. By means of the elastic connection to the rim 15, this angular change $x_{2}$ causes a deflection of the rotating angle $x_{1}$ of the rim, the rotating angle $x_{1}$ of the rim being described in a vehicle-fixed system of coordinates.

The length of the contact zone 3 in FIG. 1, which is directly related to the hydroplaning factor a, acts essentially upon the elastic and viscous characteristics of the second spring-damper element 18, as indicated in FIG. 2 by the double arrow.

Figure 3:
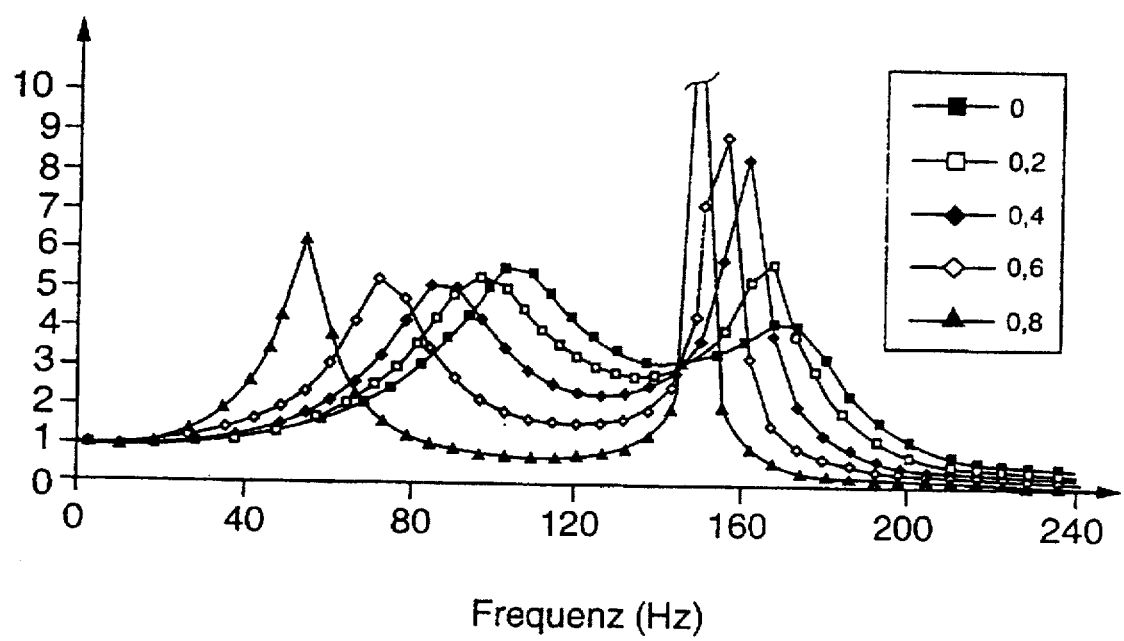
FIG. 3 is a graphic depiction of the results of a model calculation for the interfering frequency curve of the tire vibrations, at different hydroplaning intensities.

FIG. 3 shows an interfering-frequency spectrum of the tire calculated by means of the above tire simulation model, as a function of the frequency, for different contact zone lengths, (expressed in hydroplaning intensities a). The resonance ratios of the two rotational basic natural vibrations of the tire, and their increasing shift with the hydroplaning factor a, are clearly recognizable. With the approach of hydroplaning a=1 (complete hydroplaning), the resonances become more pronounced because with the reduction of the contact zone which results from increasing hydroplaning of the tire, damping of the tire vibrations also decreases because of the connection to the road. As a result, when the critical condition (a=1) is approached, the resonances and thus the hydroplaning factor a can be determined more precisely. Advantageously, the precision of the process is therefore concentrated on the critical area.

In the model calculation for the interfering-frequency spectrum, a realistic unevenness spectrum (speed noise) was used as the basis and the wheel load fluctuations $\Delta F_{z}$, which, in turn, generate the horizontal fluctuations $\Delta F_{1}$, were calculated by means of a suitable vertical-dynamics model.

The interfering-frequency spectrum in FIG. 3 was determined for a driving speed of 10 m/sec. Generally, the interfering-frequency spectrum changes quite perceptibly with the driving speed, also if the characteristic behavior of the resonance ratios is maintained. With increasing driving speed, the intensity of the unevenness excitations will rise, which is why no absolute values but only relative intensities are used for the analysis. Furthermore, the effective damping of the spring-damper element 18 is considerably influenced by the driving speed. The relationships cannot be shown in a generalized form, but can be detected in the form of characteristic diagrams by means of the driving speed and the hydroplaning factor a as the parameters.

In the case of a model-based identification of the basic natural vibrations of the tire, in addition to the hydroplaning factor and the driving speed, generally other parameters, such as the tire pressure or the tire temperature, must also be taken into account.

This can take place by corresponding coefficients (for example, pressure or temperature coefficients) with respect to the characteristic tire model parameters, which determine the characteristics of the spring and damper elements 16, 18, 19 in FIG. 2. During normal operation (a=0), the current coefficients can be determined from the continuously sensed interfering-frequency spectrum, in that an interfering-frequency curve resulting from the basic tire model is adapted for a=0. Such an approach is possible because a hydroplaning factor deviating from a=0 occurs only for a short time and comparatively rarely. When determining the model-related tire parameters, it is therefore sufficient to exclude short-term changes or very suddenly occurring changes by means of a suitable averaging or discrimination process. In contrast, for recognition of hydroplaning of the vehicle tire, suddenly occurring changes are evaluated by determining the hydroplaning factor a from the sensed detuning, based on the previously determined model-related tire parameters.

The process according to the invention which is based on an evaluation of the natural vibration of the tire can be expanded to include tire pressure monitoring. For this purpose, the model-related tire parameters determined in the normal driving operation (a=0) are compared with tire parameters at a reference pressure, and conclusions are drawn on the current tire pressure from the deviations. This process can be further expanded by relating a tire pressure thus determined for an individual wheel to the values of the other wheels determined in the same manner. For example, the tire pressure of a wheel can be compared with the mean value for all wheels and in the case of a significant deviation therefrom, a warning signal can be emitted. By means of this simple process at least a high pressure deviation of individual tires can be reliably recognized.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for detecting imminent hydroplaning of a vehicle tire by evaluation of a frequency spectrum of rotational wheel speed, said process comprising:

detecting rotational speed of a wheel which carries said vehicle tire;

continuously evaluating a natural resonance response of rotational tire vibrations in a frequency range above 20 Hz; and determining imminence of hydroplaning of the tire based on a detuning of rotational natural frequencies.

2. Process according to claim 1, wherein for evaluation of the frequency spectrum, a frequency range typical for rotational tire vibrations is divided into several frequency sections and signal intensities of different frequency sections are continuously compared with one another in order to recognize a start of the detuning of the natural frequencies.

3. Process according to claim 1, wherein evaluation of the frequency spectrum of rotational wheel speed is performed by a model-based identification of the natural frequencies of the tire, the tire model used as the basis for modelling the tire, the tire's connection to the road, and at least one model parameter each being a function of the length of a contact zone between the tire and the road prior to hydroplaning.

4. Process according to claim 3, wherein the model parameters are continuously adapted, whereby simulation of the sensed frequency spectrum is optimized, and the length of a current contact zone is determined and evaluated from the adapted values for the model parameters.

5. Process according to claim 4, wherein the determined contact zone length is related to the length of the tire contact area when the tire does not aquaplane, and a hydroplaning factor a, which describes a degree of hydroplaning and is a measurement of the danger of a current driving condition, is determined therefrom.

6. Process according to claim 5, wherein the hydroplaning factor a is indicated to the driver or, when a limit value a* is exceeded by the hydroplaning factor a, a warning signal is emitted.

7. Process according to claim 5, wherein the determined hydroplaning factor a is used to regulate intervention in at least one of power and vehicle handling.

8. Process according to claim 3, wherein the model-based identification is based on a tire model which takes into account deflections of a tire belt relative to a tire rim as well as deflections of tire profile portions relative to the tire belt.

9. Process according to claim 4, wherein a conclusion is drawn with respect to the current tire pressure or the current tire temperature from the values for the model parameters adapted in a normal driving operation.

10. Process according to claim 9, wherein, for the adaptation of the values for the model parameters in normal driving operation, an interfering-frequency curve resulting from the tire model used as the basis is adapted to the sensed frequency spectrum of the rotational wheel speeds, short-term or very suddenly occurring changes of the frequency spectrum not being taken into account.

* * * * *